(12) United States Patent
Cohoon et al.

(10) Patent No.: US 12,450,122 B2
(45) Date of Patent: Oct. 21, 2025

(54) MODIFICATION-BASED MULTIPATHING CODE

(71) Applicant: INTERNATIONAL BUSINESS MACHINES CORPORATION, Armonk, NY (US)

(72) Inventors: Michael Terrence Cohoon, Fishkill, NY (US); Andrew C. M. Hicks, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 18/538,294

(22) Filed: Dec. 13, 2023

(65) Prior Publication Data

US 2025/0199912 A1 Jun. 19, 2025

(51) Int. Cl.
G06F 11/00 (2006.01)
G06F 11/14 (2006.01)

(52) U.S. Cl.
CPC .... *G06F 11/1423* (2013.01); *G06F 2201/865* (2013.01)

(58) Field of Classification Search
CPC ........................ G06F 11/1423; G06F 2201/865
See application file for complete search history.

(56) References Cited

U.S. PATENT DOCUMENTS

| | | |
|---|---|---|
| 5,119,488 A | 6/1992 | Takamatsu et al. |
| 5,269,017 A | 12/1993 | Hayden et al. |
| 6,625,747 B1 | 9/2003 | Tawil et al. |
| 6,658,656 B1 * | 12/2003 | Thompson .......... G06F 11/1489 717/122 |
| 6,874,138 B1 | 3/2005 | Ziegler et al. |
| 7,536,603 B2 | 5/2009 | Coldicott et al. |
| 7,546,588 B2 | 6/2009 | Dickenson |
| 7,668,981 B1 | 2/2010 | Nagineni et al. |
| 8,527,743 B2 * | 9/2013 | Genta ..................... G06F 9/327 712/241 |
| 8,938,644 B2 | 1/2015 | Clark et al. |
| 9,563,538 B2 | 2/2017 | Bestgen et al. |
| 9,733,912 B2 | 8/2017 | Adl-Tabatabai et al. |
| 9,847,933 B2 | 12/2017 | DeCusatis et al. |
| 9,904,585 B1 | 2/2018 | Islam et al. |
| 10,389,639 B1 | 8/2019 | Matthews et al. |

(Continued)

FOREIGN PATENT DOCUMENTS

| | | |
|---|---|---|
| CN | 102262537 A | 11/2011 |
| CN | 106547520 A | 3/2017 |

OTHER PUBLICATIONS

Cohoon et al., Multipathing Code Execution Based on Failure Severity Background, International Business Machines Corporation (IBM), U.S. Appl. No. 18/538,166, filed Dec. 13, 2023, 25 pages.

(Continued)

*Primary Examiner* — Jason B Bryan
(74) *Attorney, Agent, or Firm* — Onyx IP Group (57) ABSTRACT

Modification-based multipathing code, includes receiving a modification to a portion of code of an application; modifying the application to include a portion of multipathing code comprising a first path corresponding to the portion of code reflecting the modification and a second path corresponding to the portion of code independent of the modification; and configuring the application to execute either the first path or the second path as a default execution path.

20 Claims, 4 Drawing Sheets

---

Receive A Modification To A Portion Of Code Of An Application 202

↓

Modify The Application To Include A Portion Of Multipathing Code Comprising A First Path Corresponding To The Portion Of Code Reflecting The Modification And A Second Path Corresponding To The Portion Of Code Independent Of The Modification 204

↓

Configure The Application To Execute Either The First Path Or The Second Path As A Default Execution Path 206

(56) References Cited

U.S. PATENT DOCUMENTS 10,990,481 B2    4/2021    Borlick et al.
2006/0191014 A1    8/2006    Zvi et al.
2017/0161033 A1*    6/2017    Darcy ........................ G06F 8/41

OTHER PUBLICATIONS

Hicks et al., Resilient Error Handling Through Multipathing Code, International Business Machines Corporation (IBM), U.S. Appl. No. 18/528,902, filed Dec. 5, 2023, 25 pages.

Appendix P; List of IBM Patent or Applications Treated as Related, Aug. 19, 2024, 2 pages.

* cited by examiner

MODIFICATION-BASED MULTIPATHING CODE

BACKGROUND

The present disclosure relates to methods, apparatus, and products for modification-based multipathing code.

SUMMARY

According to embodiments of the present disclosure, various methods, apparatus and products for modification-based multipathing code are described herein. In some aspects, modification-based multipathing code includes receiving a modification to a portion of code of an application; modifying the application to include a portion of multipathing code comprising a first path corresponding to the portion of code reflecting the modification and a second path corresponding to the portion of code independent of the modification; and configuring the application to execute either the first path or the second path as a default execution path. In some aspects, an apparatus may include a processing device; and memory operatively coupled to the processing device, wherein the memory stores computer program instructions that, when executed, cause the processing device to perform this method. In some aspects, a computer program product comprising a computer readable storage medium may store computer program instructions that, when executed, perform this method.

DETAILED DESCRIPTION

When a code path fails in a complex software system, expected operations may fail to complete. Moreover, exhaustive retry logic may hog resources, transactions can begin to fail, and components of a stack may fail, leading to potential outage. Multipathing code may be used to mitigate concerns related to failures in code paths. Multipathing code describes the use of multiple, separate code paths configured to perform similar functionality. For example, different code paths may be configured or designed to generate the same outputs when applied to the same inputs or may be configured or designed to otherwise perform similar functionality. These different code paths designed to perform the same function may be implemented by different engineers or teams such that the resulting code paths are non-identical but designed to achieve the same outcome. These different code paths may also be written in different languages, access different libraries, or otherwise differ while being designed to achieve similar functionality. Each path of the multipathing code may be accessed using a shared interface, such as an Application Program Interface (API) or other interface as can be appreciated.

When a portion of multipathing code is encountered during the execution of an application or other software, state information may be saved that describes a state of execution at the point where the portion of multipathing code is encountered. The state information may describe the values for various registers, memory locations, counters, attributes, and the like. Should an error occur in a code path of the multipathing code, the saved state information may be used as a checkpoint for reverting or rewinding the state of execution of the application to a point prior to executing the code path of the multipathing code where the error occurred. A different code path of the multipathing code may then be executed. This process may be repeated until a code path of the multipathing code is executed without error.

Existing approaches for patching or updating code cause the code to be updated to be overwritten with the new code, effectively eliminating or deprecating the old code. Multipathing code may instead be used to maintain alternate code paths for the updated code and the code prior to updating. This may allow for execution of older versions of code should an update introduce a regression error. This may also allow for updated code paths that introduce debugging or logging code to only be executed should an error occur on another code path.

Figure 1:
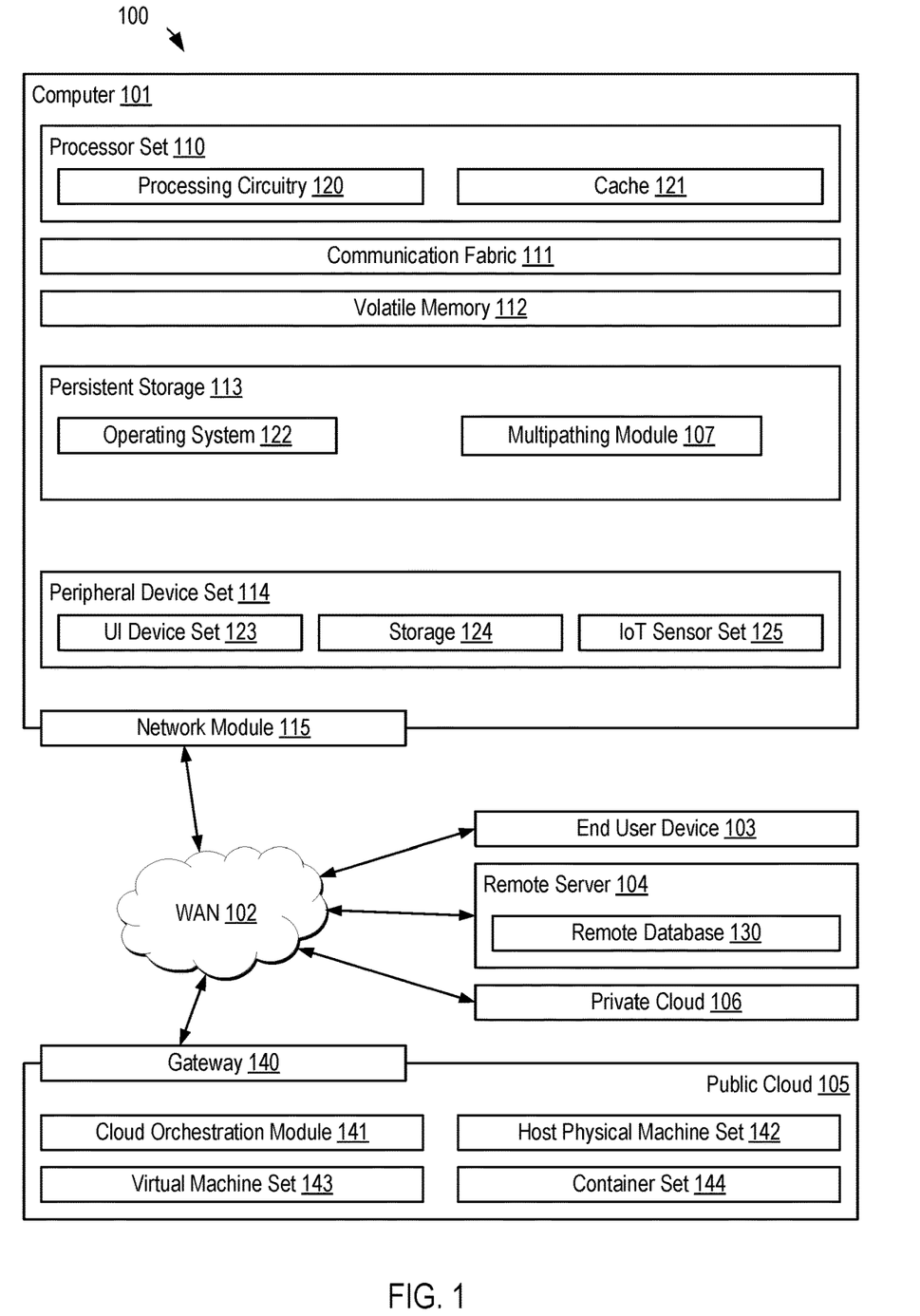
FIG. 1 sets forth a block diagram of an example computing environment for multipathing code execution based on failure severity in accordance with some embodiments of the present disclosure.

With reference now to FIG. 1, shown is an example computing environment according to aspects of the present disclosure. Computing environment 100 contains an example of an environment for the execution of at least some of the computer code involved in performing the various methods described herein, such as the multipathing module 107. In addition to the multipathing module 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and multipathing module 107, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the computer-implemented methods. In computing environment 100, at least some of the instructions for performing the computer-implemented methods may be stored in multipathing module 107 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in multipathing module 107 typically includes at least some of the computer code involved in performing the computer-implemented methods described herein.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the computer-implemented methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
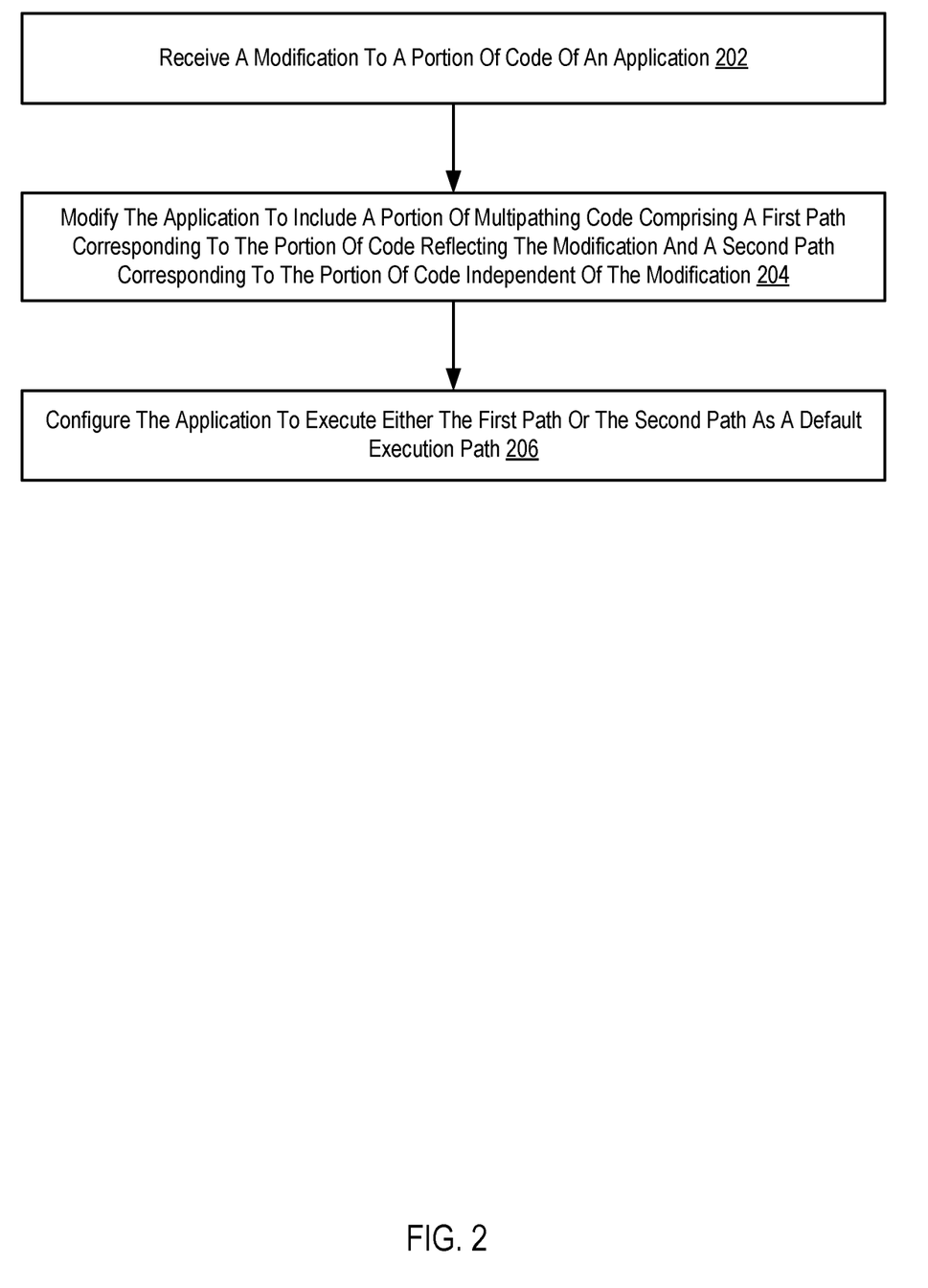
FIG. 2 sets forth a flowchart of an example method for modification-based multipathing code in accordance with some embodiments of the present disclosure.

For further explanation, FIG. 2 sets forth a flowchart of an example method of modification-based multipathing code in accordance with some embodiments of the present disclosure. The method of FIG. 2 may be performed, for example, by the multipathing module 107 of FIG. 1. In some embodiments, the multipathing module 107 may be implemented as a process or service separate from an application or software implementing multipathing code. For example, the multipathing module 107 may be implemented by an operating system or other software that monitors the behavior and execution of an application implementing multipathing code. As another example, in some embodiments, the multipathing module 107 may be implemented as a process or service that applies updates or patches to applications or code capable of implementing multipathing code, or as a process or service that monitors or detects updates or patches to applications or code capable of implementing multipathing code.

The method of FIG. 2 includes receiving 202 a modification to a portion of code of an application. Although FIG. 2 describes receiving 202 a modification of code of an application, it is understood that the approaches set forth herein may be applied to updates of any software or module capable of implementing multipathing code, including applications, operating systems, libraries, and the like. In some embodiments, a modification to a portion of code may include a patch or other portion of code or software that changes or overwrites some portion of the code of the application. In some embodiments, the modification to the portion of code may include a modification to a non-executable representation or encoding of the application, such as a modification to source code of the application. In some embodiments, the modification to the portion of code may include a modification to an executable representation or encoding of the application, such as a modification to executable code of the application (e.g., an executable binary).

In some embodiments, receiving 202 the modification to the portion of code of the application includes receiving 202 the modification as input to the multipathing module 107 to apply to the application. In some embodiments, receiving 202 the modification to the portion of code may include detecting receipt of the modification by some other application or service. For example, in some embodiments, receiving 202 the modification to the portion of code may include detecting that some other application or service has received the modification or is attempting to apply the modification to the application.

The method of FIG. 2 also includes modifying 204 the application to include a portion of multipathing code comprising a first path corresponding to the portion of code reflecting the modification and a second path corresponding to the portion of code independent of the modification. Rather than overwriting or modifying the application to reflect the modification, thereby eliminating the modified portion of the application as it existed prior to modification, the application is modified to instead include a portion of multipathing code corresponding to the portion of the application modified by the modification. Thus, after modification, the application includes a portion of multipathing code including two code paths: one including code prior to modification (e.g., independent of the modification) and one including code after modification (e.g., reflecting the modification).

In some embodiments, modifying 204 the application may include storing the original (e.g., unmodified) code path (e.g., as source code or executable code) for retrieval, re-assembly, re-linking, and the like such the original code path may be used as one of the code paths of the multipathing code. In some embodiments, modifying 204 the application may include inserting code configured to generate state information describing a state of execution of the application prior to executing any of the code paths of the portion of multipathing code. Such code may be inserted into the application prior to the portion of multipathing code or as part of an interface or function call used to execute the portion of multipathing code. In some embodiments, modifying 204 the application may include generating an interface such as an API or API call used to execute the code paths of multipathing code. Accordingly, in some embodiments, modifying 204 the application may include inserting a call to such an interface in the application.

As an example, assume that a modification is received to modify some portion of the application to fix a bug or otherwise modify how some operations is performed. In this example, the application is modified 204 to include a portion of multipathing code with a first path reflecting the bug fix and a second path reflecting the application independent of the bug fix. As another example, assume that a modification is received 204 that inserts debug statements, logging statements, tracing functions, and the like that may be used to troubleshoot some error. In this example, the application is modified to include a portion of multipathing code with a first path including these statements and functions and a second path excluding these statements and functions.

The method of FIG. 2 also includes configuring 206 the application to execute either the first path (e.g., the path reflecting the modification) or the second path (e.g., the path independent of the modification) as a default execution path. The default execution path is the code path of the portion of multipathing code to be executed first. Thus, if an error occurs during execution of the default execution path, the alternative or non-default code path may then be executed.

Whether the application is configured 206 to execute the first path or the second path as the default execution path may vary depending on particular design considerations as well as the use-case or purpose of the modification. As an example, assume that the modification includes a bug fix. In some embodiments, the first path reflecting the modification may be set as the default execution path. Should this bug fix introduce a regression error, causing an error in execution of the first path, the second path independent of the modification may instead be executed. As another example, assume that the modification includes a bug fix to address a bug only present in some systems or system configurations. In this example, the first path or the second path may be set as the default execution path depending on whether the bug was present in the system executing the application. For example, systems where the bug is present may have the first path reflecting the modification set as their default execution path while systems where the bug is not present may have the second path independent of the modification set as their default execution path.

As a further example, assume that the modification introduces logging or debug statements to facilitate troubleshooting of some error. Execution of these logging or debug statements may result in a negative performance impact due to the additional computational overhead required. In this example, the second path independent of the modification may be set as the default execution path. Should some error occur in executing this code path, the first path reflecting the modification (e.g., including the logging or debug statements) may then be executed such that debug information may be generated and captured. This allows for the logging or debug statements to only be executed when an error is detected, saving on any performance impact that would be caused by executing these debug statements where no error is detected.

Figure 3:
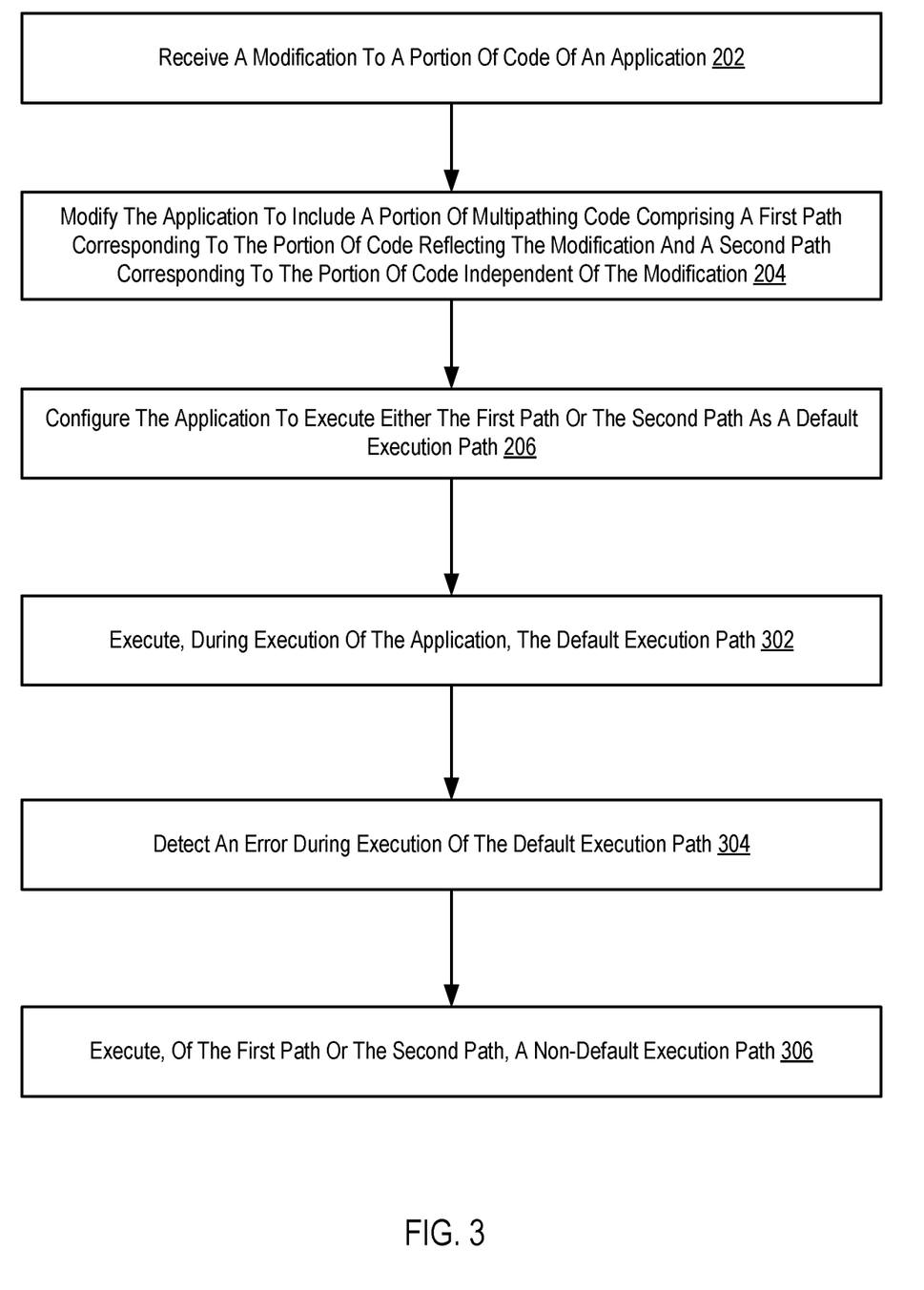
FIG. 3 sets forth a flowchart of another example method for modification-based multipathing code in accordance with some embodiments of the present disclosure.

For further explanation, FIG. 3 sets forth a flowchart of an example method of modification-based multipathing code in accordance with some embodiments of the present disclosure. The method of FIG. 3 is similar to FIG. 2 in that the method of FIG. 3 includes: receiving 202 a modification to a portion of code of an application; modifying 204 the application to include a portion of multipathing code comprising a first path corresponding to the portion of code reflecting the modification and a second path corresponding to the portion of code independent of the modification; and configuring 206 the application to execute either the first path or the second path as a default execution path.

FIG. 3 differs from FIG. 2 in that the method of FIG. 3 also includes executing 302, during execution of the application, the default execution path. In some embodiments, as will be described in further detail below, executing 302 the default execution path may include storing state information that facilitates restoring a state of execution of the application should an error occur in the default execution path. In some embodiments, executing 302 the default execution path includes accessing or querying an interface that accesses the multipathing code that includes the first path and the second path (e.g., the default execution path and the non-default execution path).

The method of FIG. 3 also includes detecting 304 an error during execution of the default execution path. The detected 304 may include any of a variety of execution errors as can be appreciated. For example, the error may include a thrown exception including a caught or uncaught exception. As another example, the error may include failure of some verification or validation check performed during execution of the default execution path.

The method of FIG. 3 also includes executing 306, of the first path or the second path, a non-default execution path. In other words, if the application was configured 206 to execute the first path as the default execution path, the second path will be executed 306 as the non-default execution path. If the application was configured 206 to execute the second path as the default execution path, the first path will be executed 306 as the non-default execution path. As will be described in further detail below, in some embodiments, executing 306 the non-default execution path may include restoring previously saved state information describing a state of execution of the application prior to executing the default execution path. In some embodiments, executing 306 the non-default execution path includes accessing or querying an API or other interface used to execute the different code paths of the multipathing code.

As an example, assume that a code path reflecting a bug fix is executed 302 as the default execution path. Due to a regression error in this bug fix an error is detected 304 during execution of the default execution path. In response to this error a non-default execution path is executed 306 that does not reflect the bug fix is executed. As another example, assume that a code path not including debug statements added via a modification is executed 302 as the default execution path. In response to detecting 304 an error in the default execution path the non-default execution path including the debug statements is executed 306.

Figure 4:
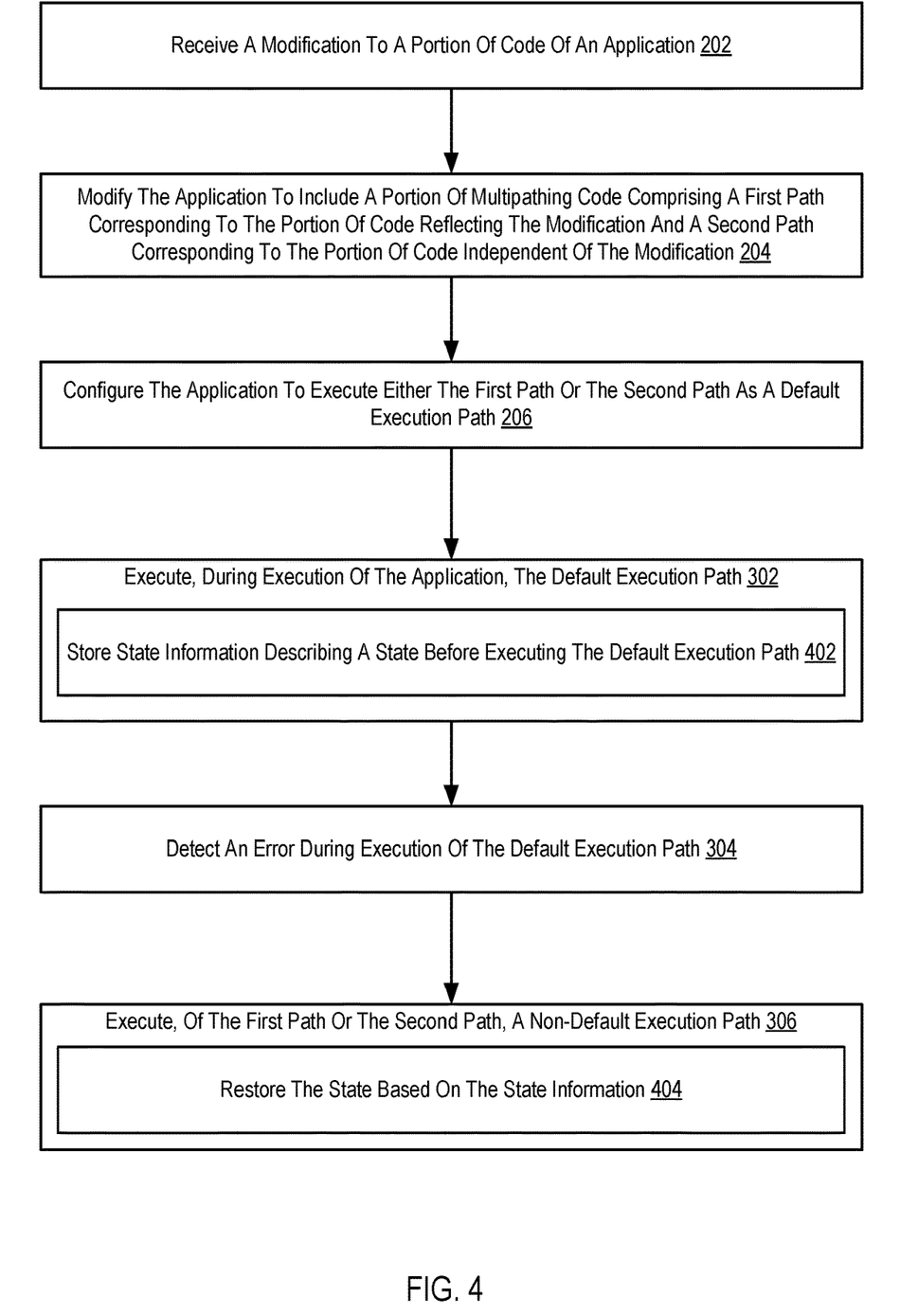
FIG. 4 sets forth a flowchart of another example method for modification-based multipathing code in accordance with some embodiments of the present disclosure.

For further explanation, FIG. 4 sets forth a flowchart of an example method of modification-based multipathing code in accordance with some embodiments of the present disclosure. The method of FIG. 4 is similar to FIG. 3 in that the method of FIG. 4 includes: receiving 202 a modification to a portion of code of an application; modifying 204 the application to include a portion of multipathing code comprising a first path corresponding to the portion of code reflecting the modification and a second path corresponding to the portion of code independent of the modification; configuring 206 the application to execute either the first path or the second path as a default execution path; executing 302, during execution of the application, the default execution path; detecting 304 an error during execution of the default execution path; and executing 306, of the first path or the second path, a non-default execution path.

FIG. 4 differs from FIG. 3 in that executing 302, during execution of the application, the default execution path includes storing 402 state information describing a state before executing the default execution path. As is described above, in order to effectively execute the different code paths of multipathing code, state information describing a state of execution of the application prior to executing the multipathing code may be generated and saved. Thus, should an error occur during execution of some code path of the multipathing code, this state information may be later used to restore the state of execution and then execute another path of the multipathing code. The saved state information may include a variety of information, including values for various registers, memory locations, counters, attributes, or other information as can be appreciated.

The method of FIG. 4 further differs from FIG. 3 in that executing 306, of the first path or the second path, a non-default execution path also includes restoring 404 the state based on the state information. For example, in some embodiments, data encoding the state information may be loaded and the stored values accessed. These stored values may then be saved into their various registers, memory locations, counters, and the like. This effectively restores or rewinds execution of the application to the state reflected by the stored state information (e.g., to the point before where any of the different code paths of the multipathing code are executed). This allows any of the paths of multipathing code to be executed from effectively the same state. In this example, restoring 404 the state based on the state information allows the application to execute 306 the non-default execution path from an effectively same state as when executing 302 the default execution path.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A method comprising:
receiving a modification to a portion of source code of an application;
modifying the application to include a portion of multipathing code comprising a first path corresponding to the portion of source code reflecting the modification and a second path corresponding to the portion of source code independent of the modification; and
configuring the application to execute either the first path or the second path as a default execution path.

2. The method of claim 1, wherein the default execution path comprises the first path.

3. The method of claim 1, wherein the default execution path comprises the second path.

4. The method of claim 1, further comprising:
   execute, during execution of the application, the default execution path;
   detect an error during execution of the default execution path; and
   execute, of the first path or the second path, a non-default execution path.

5. The method of claim 4, wherein executing the default execution path comprises storing state information describing a state before executing the default execution path.

6. The method of claim 5, wherein executing the non-default execution path comprises restoring the state based on the state information.

7. The method of claim 1, wherein the modification introduces one or more logging actions.

8. The method of claim 1, wherein the modification comprises one or more debug statements that are absent from the second path.

9. The method of claim 1, wherein the first path is based on a different programming language than the second path.

10. An apparatus comprising:
    a processing device; and
    memory operatively coupled to the processing device, wherein the memory stores computer program instructions that, when executed, cause the processing device to:
    receive a modification to a portion of source code of an application;
    modify the application to include a portion of multipathing code comprising a first path corresponding to the portion of source code reflecting the modification and a second path corresponding to the portion of source code independent of the modification; and
    configure the application to execute either the first path or the second path as a default execution path.

11. The apparatus of claim 10, wherein the default execution path comprises the first path.

12. The apparatus of claim 10, wherein the default execution path comprises the second path.

13. The apparatus of claim 10, wherein the computer program instructions, when executed, cause the processing device to:
    execute, during execution of the application, the default execution path;
    detect an error during execution of the default execution path; and
    execute, of the first path or the second path, a non-default execution path.

14. The apparatus of claim 13, wherein executing the default execution path comprises storing state information describing a state before executing the default execution path.

15. The apparatus of claim 14, wherein executing the non-default execution path comprises restoring the state based on the state information.

16. The apparatus of claim 9, wherein the modification comprises one or more debug statements that are absent from the second path.

17. A computer program product comprising a computer readable storage medium, wherein the computer readable storage medium comprises computer program instructions that, when executed:
    receive a modification to a portion of source code of an application;
    modify the application to include a portion of multipathing code comprising a first path corresponding to the portion of source code reflecting the modification and a second path corresponding to the portion of source code independent of the modification; and
    configure the application to execute either the first path or the second path as a default execution path.

18. The computer program product of claim 17, wherein the default execution path comprises the first path.

19. The computer program product of claim 17, wherein the default execution path comprises the second path.

20. The computer program product of claim 17, wherein the computer program instructions, when executed:
    executing, during execution of the application, the default execution path;
    detecting an error during execution of the default execution path; and
    executing, of the first path or the second path, a non-default execution path.

* * * * *